(12) United States Patent
Low

(10) Patent No.: US 7,174,474 B1
(45) Date of Patent: Feb. 6, 2007

(54) DISTRIBUTED AUTONOMOUS CONTROL SYSTEM FOR MULTI-AXIS MOTION CONTROL

(75) Inventor: Moon Leong Low, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 11/248,855

(22) Filed: Oct. 12, 2005

(51) Int. Cl.
G06F 1/12 (2006.01)
G06F 13/42 (2006.01)
G06F 15/16 (2006.01)
H03K 4/90 (2006.01)
H03L 7/00 (2006.01)
H04J 3/06 (2006.01)
G05B 11/01 (2006.01)

(52) U.S. Cl. ............ 713/401; 713/400; 327/136; 327/141; 709/248; 709/251; 709/252; 370/519; 700/71; 700/72

(58) Field of Classification Search ........ 713/400–401; 327/136, 141; 709/248, 251–252; 370/519; 700/71–72
See application file for complete search history.

(56) References Cited

U.S. PATENT DOCUMENTS

| | | | | |
|---|---|---|---|---|
| 5,361,277 A | * | 11/1994 | Grover | 375/356 |
| 5,914,963 A | * | 6/1999 | Basile | 714/700 |
| 6,112,308 A | * | 8/2000 | Self et al. | 713/400 |
| 6,718,476 B1 | * | 4/2004 | Shima | 713/400 |
| 6,804,580 B1 | * | 10/2004 | Stoddard et al. | 700/248 |
| 6,918,047 B1 | * | 7/2005 | Sita et al. | 713/401 |
| 6,943,610 B2 | * | 9/2005 | Saint-Laurent | 327/295 |
| 7,024,257 B2 | * | 4/2006 | Pearce et al. | 700/72 |
| 2001/0024455 A1 | * | 9/2001 | Thaler et al. | 370/503 |
| 2002/0031199 A1 | * | 3/2002 | Rolston et al. | 375/356 |
| 2004/0064750 A1 | * | 4/2004 | Conway | 713/401 |
| 2005/0144309 A1 | * | 6/2005 | Gish | 709/233 |
| 2006/0056403 A1 | * | 3/2006 | Pleasant et al. | 370/389 |
| 2006/0056459 A1 | * | 3/2006 | Stratton et al. | 370/503 |
| 2006/0056559 A1 | * | 3/2006 | Pleasant et al. | 375/356 |
| 2006/0059270 A1 | * | 3/2006 | Pleasant et al. | 709/237 |
| 2006/0129776 A1 | * | 6/2006 | Ware et al. | 711/167 |

* cited by examiner

*Primary Examiner*—Anthony Knight
*Assistant Examiner*—Ronald D Hartman, Jr.

(57) ABSTRACT

A distributed multi-axis motion control system comprises a multicast communications network having several node components. Each of the node components includes a clock and an actuator. The actuators are part of a motor system and a pattern profile table of the motor system is generated. The pattern profile table is translated into a separate single-direction-of-motion pattern table to separately direct the motion of each of the actuators of the node components. A grandmaster clock generates synchronization signals which are transmitted through the network at a sync interval and which synchronize the clocks. Time-bombs are generated at an interval which is a whole number multiple of the sync interval. The time-bombs cause concurrent execution of the first and subsequent steps from the single-direction-of-motion pattern tables to produce synchronized multi-axis motion of the motor system.

13 Claims, 4 Drawing Sheets

DISTRIBUTED AUTONOMOUS CONTROL SYSTEM FOR MULTI-AXIS MOTION CONTROL

FIELD OF THE INVENTION

The invention relates to the field of motion control systems.

BACKGROUND OF THE INVENTION

Distributed measurement and control systems are often very complex involving multiple sensors and actuators (actuators convert electrical energy into mechanical motion) interacting with the system. A multistand printing press provides an example of such a system with multiple sensors and actuators. There are numerous motors, sensors, and controllers involved in adjusting the rotational speeds of the rollers for proper functioning of the press. The timing of such a system is critical to successful operation. Events or operations in each of the components must be time coordinated to achieve the desired synchronized motion for successful operation.

Similar timing requirements can be found in manufacturing systems, process control, robotics, and other industrial applications, such as paper converting and high-speed packaging machines.

Pure measurement applications often have precise timing requirements to enable successful correlation of the data. When there are many sensors involved, such as large-scale arrays for particle detection, vibration studies, and fault detection in telecommunications or power systems, timing requirements can be quite difficult to meet.

System architectures for meeting timing requirements may be divided into three categories: message based, cycle based and time based.

For message-based systems, timing is based on the time of receipt of a command or data message. FIG. 1 illustrates a typical prior-art measurement system with a central controller managing several sensors. For message-based systems, timing is based on the time of receipt In many industrial applications, the direct communication to the sensors is managed by a programmable logic controller (PLC), with the resulting data communicated to a supervisory controller or an operator workstation. In machine control applications, such as robotics, packaging, etc., the sensors are often tied directly into the system controller without an intervening PLC. Similarly, in laboratory environments, communication is directed to the host processor, which typically is a personal computer (PC) running some sort of real-time operating system.

Returning to the specific prior-art example of FIG. 1, two sensors are shown communicating to a PLC via a bus, such as one of the controlled-area network (CAN) based buses and two other sensors are directly wired into the PLC, one directly to an input-output (I/O) module and the other via a serial link. In a laboratory or data acquisition configuration, sensor data communication is often directed to the PC with no intervening PLC. This is typically via a direct link, such as RS-232 or a bus such as IEEE-488.

In message-based systems, the controller typically polls each of the sensors by sending a command or message to the sensor. In a polled system, sensor timing is based on the time of receipt of this message from the controller. Thus, the temporal properties of the program executing in the PLC or PC, the communication latency in the I/O links to the sensor, and any latency in the sensor itself establish the time of sensing.

Message-based systems work very well when the required timing accuracy is not extreme, the timing schedule is simple, and intersample intervals are easy to meet given other application requirements. Timing accuracy is limited by fluctuations in the communication link, the operating system, the sensor, and the accuracy to which the latency can be measured. Such systems limit flexibility because closely spaced measurements are either difficult or impossible, depending on the characteristics of the computing environment, communication links, and the particular application. Simultaneous sensing is impossible in a pure message-based polling system unless some sort of global execution trigger is provided, for example, the group trigger function of IEEE-488.

For cycle-based systems, sensor and actuator timings are based on a periodic schedule typically established either as part of the communication link or the architecture of the controller application. For example, FIG. 2 illustrates a measurement system with a central controller managing several sensors and using a cyclic bus such as ControlNet or IEEE-1394.

Motion control applications often use cyclic control based on the serial real-time control system (SERCOS) bus, as illustrated in FIG. 3. In this case, the PLC communicates update values to the servo-drives via the SERCOS bus.

Cyclic systems are not a good match for applications in which the sampling intervals must be changed during operation in a way not commensurate with the original interval. Once established, the cycles can be very repeatable and accurate, but the process of changing cycle period and definition during normal operation is not trivial. Also, the amount of data sent during the interval is limited by the duration of the interval. And most cyclic networks like SERCOS support only the grandmaster-slave type of communication, while many modern control applications require support of peer-to-peer communication.

For time-based systems, sensor sampling, actuator timing, and initiation of critical control code are based on triggering the specified actions referenced to the time of a real-time clock rather than on message receipt, interrupts, or as a consequence of the speed of execution of control code. The highest accuracy is achieved if the real-time clock is local to the device implementing a specific trigger (FIG. 4).

Weak coupling between system timing and message generation/delivery in time-based systems provides system designers additional freedom in meeting system requirements. The general computing environment based on a common sense of time established using the network time protocol (NTP) exploits this weak coupling. NTP targets large distributed computing systems with millisecond synchronization requirements. The protocol proposed in this standard specifically addresses the needs of measurement and control systems: spatially localized, microsecond to submicrosecond accuracy, administration free, and accessible for both high-end devices and low-cost, low-end devices.

Correct operation of such a system depends on the real-time clocks being synchronized to their peers with sufficient accuracy to meet the application requirements. In this system, the timing accuracy of the various events in the system is a function of the accuracy to which the local real-time clocks are synchronized, as opposed to the determinism of the communication links and application program execution as in the other timing methods. Application program execution in the controller and communication latency is still an issue but only insofar as the specification of the event or the time-stamped data arrives before it is needed. That is, arrival time must precede the actual time of execution. This is a much looser requirement than requiring that the arrival time be coincident with the time of execution.

In a distributed system, the local clocks may be synchronized via a protocol, such as IEEE 1588.

IEEE 1588 specifies a protocol for synchronizing real-time clocks in networked systems of distributed components characterized by: relatively compact systems of perhaps a few subnets; minimal use of network bandwidth, node computing, and memory resources devoted to clock synchronization; low administration overhead; and low-end and low-cost devices.

The protocol uses networks supporting multicast communications including but not limited to Ethernet. Because of the increased use of Ethernet in measurement and control environments, Annex D of IEEE 1588 specifies the mapping to User Datagram Protocol/Internet Protocol (UDP/IP) on Ethernet.

FIG. 5 illustrates typical components and topology for an Ethernet-based distributed system. Each leaf or node component, such as a sensor, actuator, or controller, includes a clock synchronized through the IEEE 1588 protocol. Attached to a router are subnets A and B. Each of the subnets consists of a switch or repeater connected to several of the clocks. The router also includes a boundary clock defined in the IEEE 1588 specification.

The protocol defines a grandmaster-slave hierarchy of synchronization. The protocol will automatically select one clock in each subnet to be the subnet grandmaster, and one clock in the system to be the system grandmaster, termed the grandmaster. Selection is based on properties of each clock, such as stability and accuracy on the topology of the network.

In motion control systems it is also well known to determine patterns of the motions of motor systems using graphic software. The patterns are then used for controlling the motor systems. However, such patterns have not been effectively applied to distributed time synchronized systems.

It would be desirable to use pattern s with distributed autonomous control systems for multi-axis motion control.

SUMMARY OF THE INVENTION

The present invention applies patterns tables to distributed autonomous control systems for multi-axis motion control.

More particularly, an embodiment of the present invention provides a distributed multi-axis motion control system comprises a multicast communications network having several node components. Each of the node components includes a clock and an actuator. The actuators are part of a motor system and a pattern profile table of the motor system is generated. The pattern profile table is translated into a separate single-direction-of-motion pattern table to separately direct the motion of each of the actuators of the node components. A grandmaster clock generates synchronization signals which are transmitted through the network at a sync interval and which synchronize the clocks. Time-bombs are generated at an interval which is a whole number multiple of the sync interval. The time-bombs cause concurrent execution of the first and subsequent steps from the single-direction-of-motion pattern tables to produce synchronized multi-axis motion of the motor system.

DETAILED DESCRIPTION

The present invention provides a distributed autonomous control system for multi-axis motion control by distributing pattern profile tables to node components having clocks synchronized using a method, such as the IEEE 1588 protocol, for achieving a common sense of time for the network.

Figure 6:
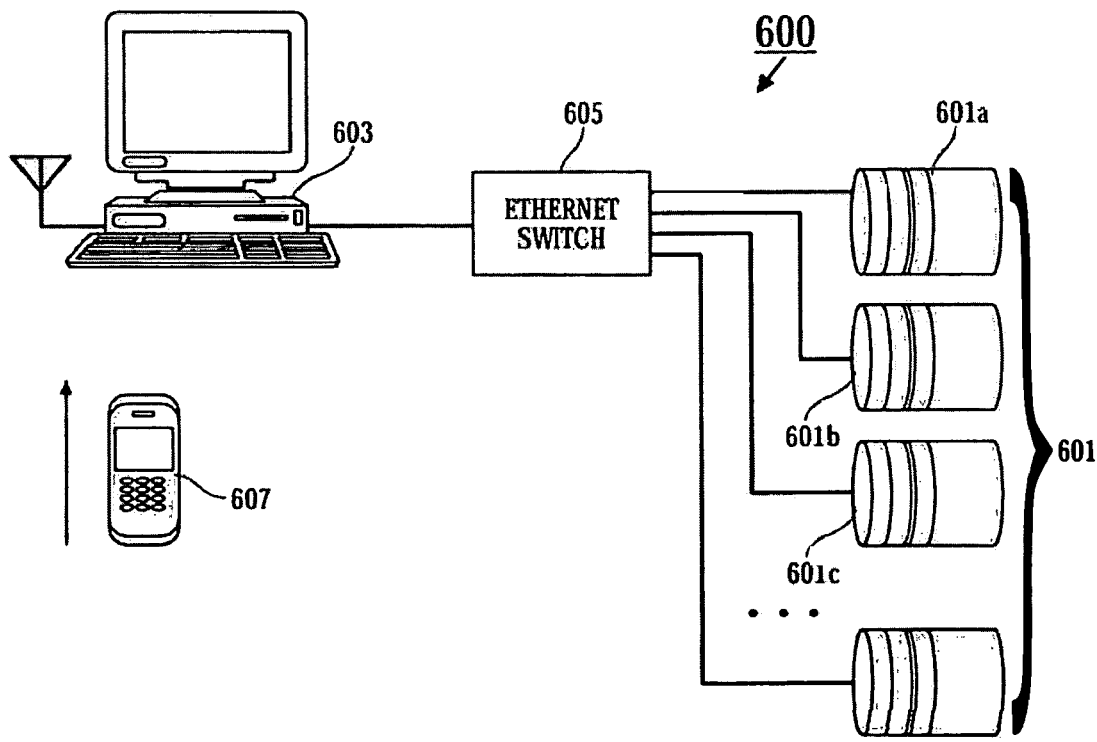
FIG. 6 shows an one embodiment of the autonomous control system for multi-axis motion control of the present invention.

FIG. 6 shows an exemplary autonomous control system for multi-axis motion control 600 of the present invention. Multiple node or leaf components 601 are connected to a host processor 603 through an Ethernet switch 605. The node components 601 control the various axes of motion of various motors of a motor system and can include sensors for reporting back position information to the host processor 603. The node components 601 can be controlled remotely by a device, such as a mobile telephone 607 wirelessly communicating with the processor 603.

Figure 1:
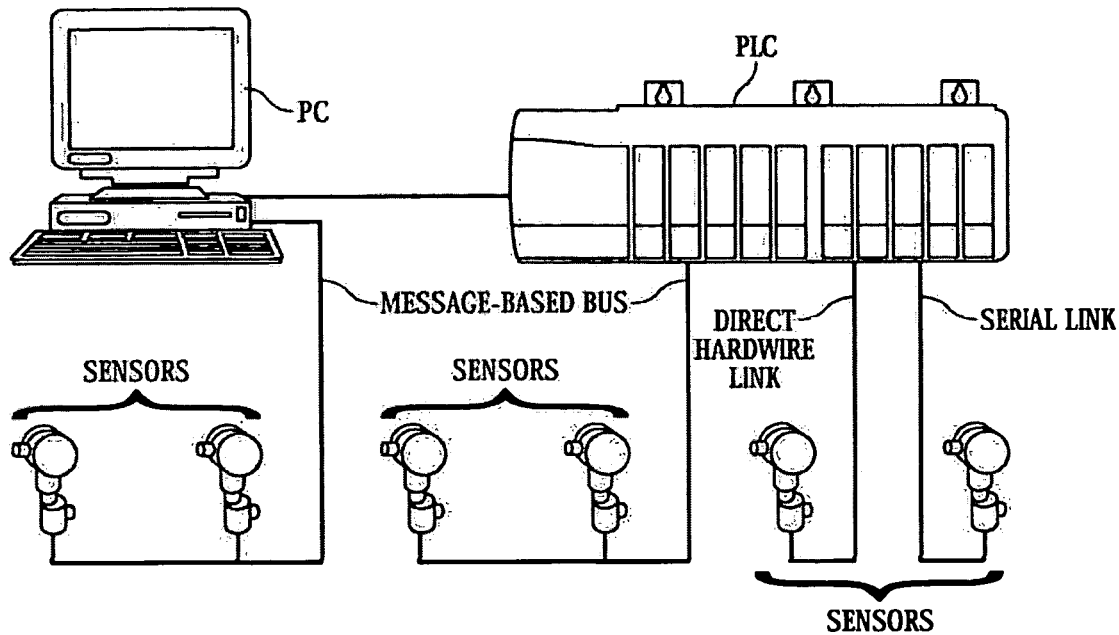
FIG. 1 illustrates a prior-art measurement system with a central controller managing several sensors.
Figure 2:
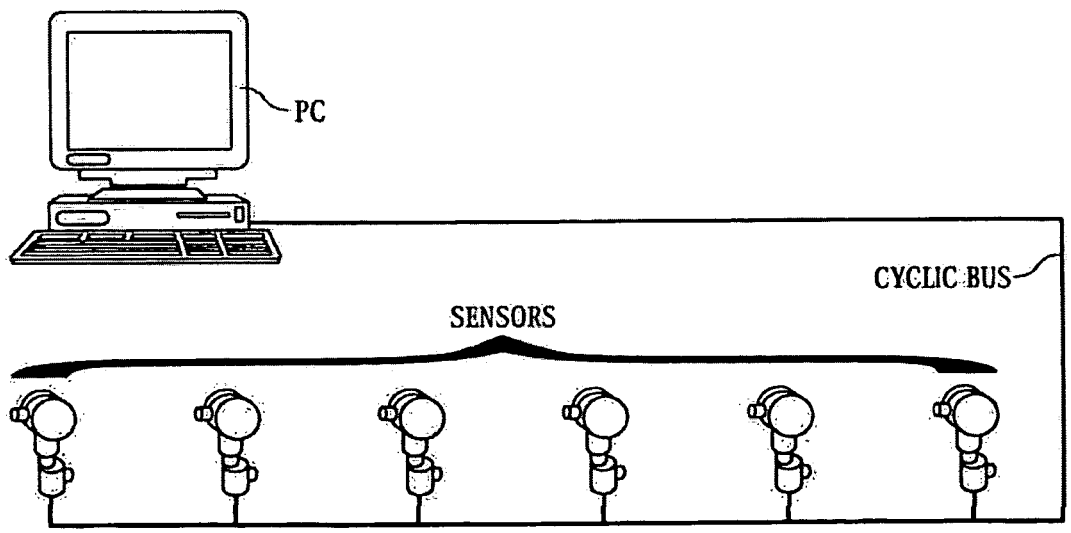
FIG. 2 illustrates another prior-art measurement system with a central controller managing several sensors and using a cyclic bus such as ControlNet or IEEE-1394.
Figure 3:
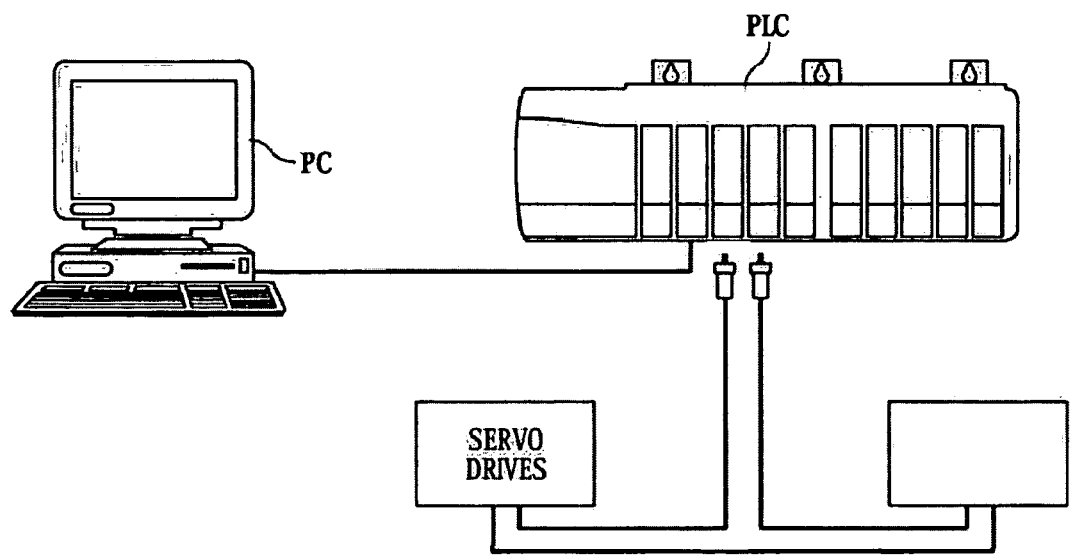
FIG. 3 illustrates a prior-art cyclic control system based on the serial real-time control system (SERCOS) bus.
Figure 4:
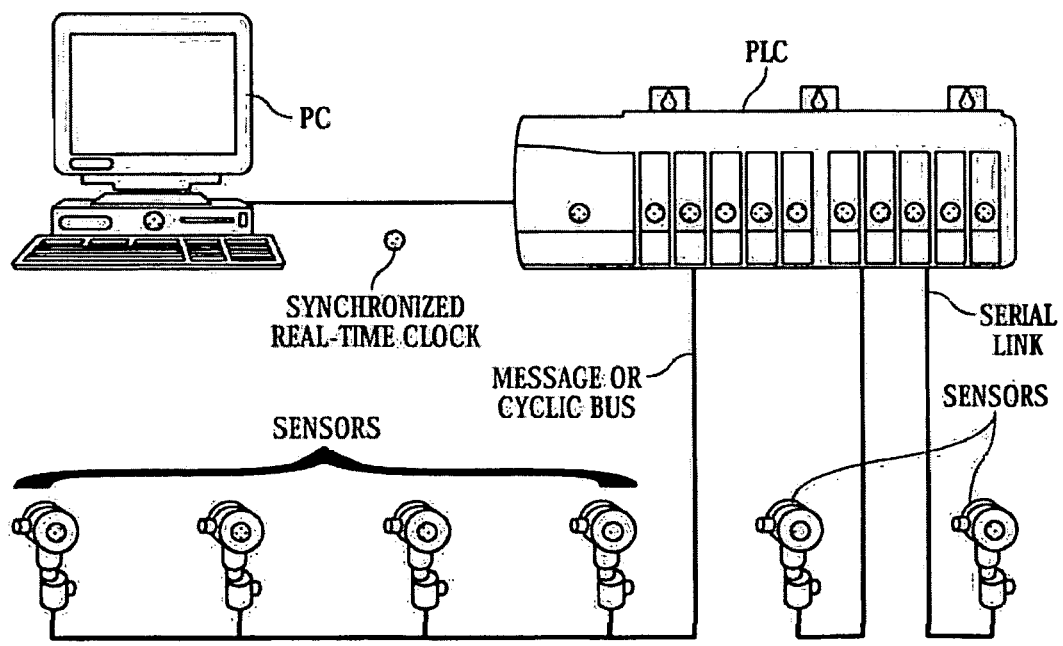
FIG. 4 illustrates a time-based control system of the prior art.
Figure 5:
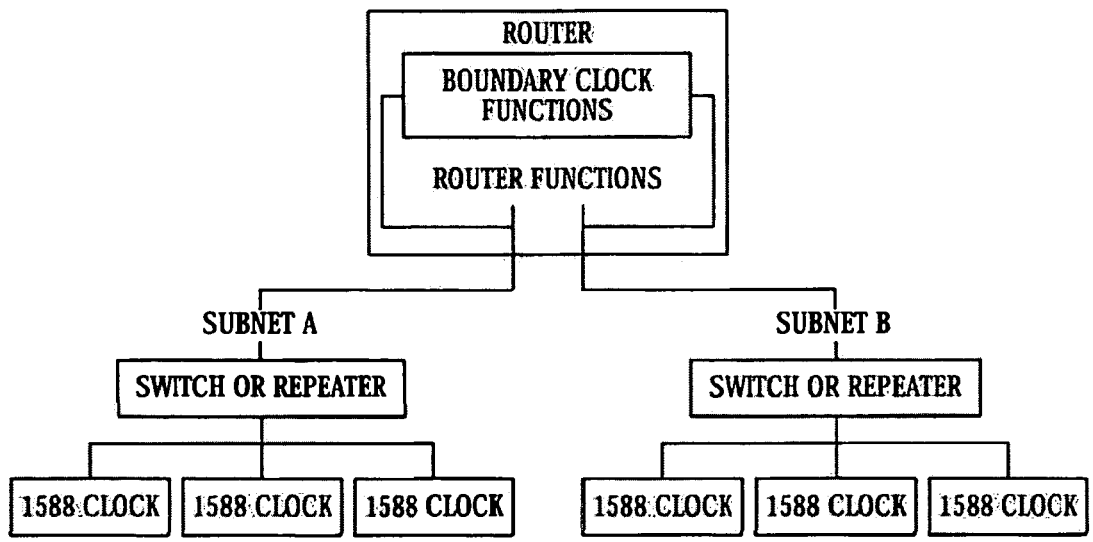
FIG. 5 illustrates typical components and topology for a prior-art Ethernet-based distributed system.

The node components 601 include a clocks synchronized through the IEEE 1588 protocol, as known in the art, and the clocks can be arranged as in the multi-subnet system of FIG. 5.

Figure 7:
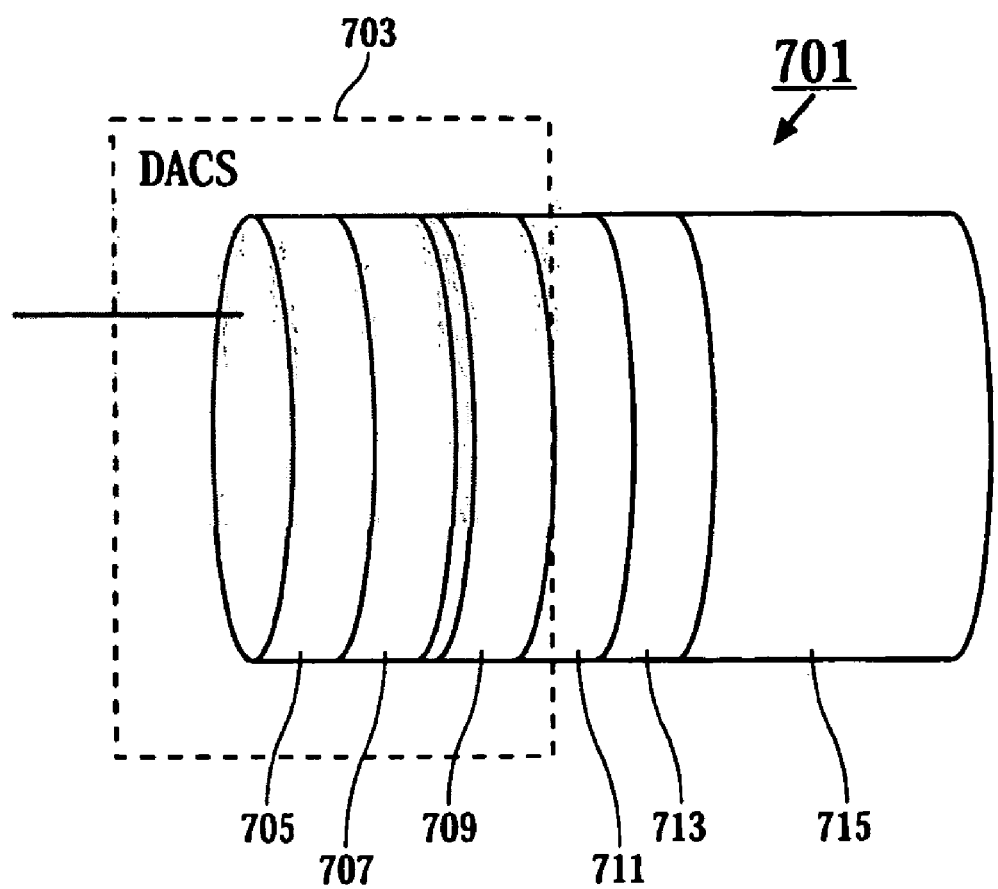
FIG. 7 shows a more detailed view of a node component.

FIG. 7 shows a node component 701 which is a more detailed view of any one of the node components 601. The node component 701 includes an actuator 715 for moving the load in a servomotor along an axis, a sensor 713 for determining the position of the load, and a driver 711 for the sensor 713 and actuator 715.

The node component 701 is controlled by a Distributed Autonomous Control System (DACS) 703 including a front-end communication chip 705 for handling all communication between the separate node components and between the node component and the host processor 603. The chip 705 also includes a IEEE 1588 synchronized clock which can be one of the IEEE 1588 clocks indicated in FIG. 7.

A IEEE 1588 grandmaster clock generates synchronization signals transmitted through the network at a sync interval. These signals synchronize the clocks in the node components 601.

The node component 701 also includes a motor controller board 707 which can control any type of motor and a process I/O board 709 which performs digital and analog I/O interfacing with the sensor 713 and actuator 715.

The invention is now described with respect to three different cases:

Case 1: Motor Systems

First, the host processor 603 creates a pattern for the motor system using a graphic software for analyzing 3-D motion, as is known in the art. In the present example, it is assumed that in FIG. 6 the node components 601 include a node component 601a for causing and sensing X-axis motion, a node component 601b for causing and sensing Y-axis motion, and a node component 601c for causing and sensing Z-axis motion. The pattern is then converted to a numerical format pattern profile table as shown in TABLE 1. It should be noted that in other embodiments different axes can be used by the software and the node components can cause and sense motion along other coordinate systems such as cylindrical or spherical coordinate systems and the following examples would be modified appropriately.

TABLE 1

3-D Pattern Profile Table

| Sequence | Relative Time | X-axis (displacement) | Y-axis (displacement) | Z-axis (displacement) |
|---|---|---|---|---|
| 1 | 0 | 1 | 5 | 0 |
| 2 | T1 | 3 | 6 | 0 |
| 3 | T2 | 5 | 3 | 2 |
| 4 | T3 | 6 | 10 | 3 |
| 5 ... | T4 | 2 | 0 | 1 |

The pattern of TABLE 1 is then pre-processed and translated by a Pattern Profiler of each node axis into separate pre-processed pattern tables for the X-axis (see TABLE 2a), Y-axis (see TABLE 2b) and Z-axis (see TABLE 2c). These tables can also be called "single-direction-of-motion pattern profile tables" because each one represents the motion to be created by a single actuator. The values in the XYZ columns represent displacement in normalized units and can be scaled as needed to change the size of the pattern proportionately.

The pre-processed pattern tables TABLE 2a, TABLE 2b, and TABLE 2c are then transmitted from the host processor 603 to the process I/O boards 709 of the corresponding node components 601a, 601b and 601c, respectively. The process I/O boards 709 further interpret the TABLES 2a, 2b,2c into the post processed TABLES 3a, 3b and 3c which contain the actual commands to the motor controller boards 707. The TABLES 3a, 3b and 3c provide exemplary values in the form of actual command values for position, velocity and acceleration.

TABLE 2a

| Sequence | Relative Time | X-axis (displacement) |
|---|---|---|
| 1 | 0 | 1 |
| 2 | T1 | 3 |
| 3 | T2 | 5 |
| 4 | T3 | 6 |
| 5 ... | T4 | 2 |

TABLE 2b

| Sequence | Relative Time | Y-axis (displacement) |
|---|---|---|
| 1 | 0 | 5 |
| 2 | T1 | 6 |
| 3 | T2 | 3 |
| 4 | T3 | 10 |
| 5 ... | T4 | 0 |

TABLE 2c

| Sequence | Relative Time | Z-axis (displacement) |
|---|---|---|
| 1 | 0 | 0 |
| 2 | T1 | 0 |
| 3 | T2 | 2 |
| 4 | T3 | 3 |
| 5 ... | T4 | 1 |

TABLE 3a

| Sequence | Relative Time | Position X (displacement) | Velocity (displacement) | Acceleration (displacement) |
|---|---|---|---|---|
| 1 | 0 | 1 | 50 | 4 |
| 2 | T1 | 3 | 10 | 1 |
| 3 | T2 | 5 | 10 | 2 |
| 4 | T3 | 6 | 10 | 10 |
| 5 ... | T4 | 2 | 20 | 0.5 |

TABLE 3b

| Sequence | Relative Time | Position Y (displacement) | Velocity (displacement) | Acceleration (displacement) |
|---|---|---|---|---|
| 1 | 0 | 5 | 1 | 5 |
| 2 | T1 | 6 | 3 | 6 |
| 3 | T2 | 3 | 5 | 3 |
| 4 | T3 | 10 | 6 | 10 |
| 5 ... | T4 | 0 | 2 | 0 |

TABLE 3c

| Sequence | Relative Time | Z-axis (displacement) | Velocity (displacement) | Acceleration (displacement) |
|---|---|---|---|---|
| 1 | 0 | 0 | 1 | 5 |
| 2 | T1 | 0 | 3 | 6 |
| 3 | T2 | 2 | 5 | 3 |
| 4 | T3 | 3 | 6 | 10 |
| 5 ... | T4 | 1 | 2 | 0 |

Included in the Tables 3a, 3b, 3c is a relative start time "0". Once all the tables are set, a time-bomb (TB) is sent to the node components 601 to begin the actuator motions. A time-bomb produces an internal or external effect at a high-precision time. The first step of the sequences for the X, Y and Z axis motion are performed simultaneously at the same absolute time in response to the time-bomb because the clocks of the front-end communication chips 705 of the node components 601 are all synchronized in the IEEE 1588 system.

The time-bombs are whole number multiples of the IEEE 1588 time sync resolution or sync interval. So if the time sync resolution is 25 nanoseconds, then the time-bombs occur every 25×N nanoseconds, where N is an integer. If N is 300 in a particular system, then the time-bombs will occur every 7.5 microseconds.

At the start time, "0", sequence 1 is triggered and the three axes operate simultaneously as follows:

the X axis sends: 1, 50, 4;

the Y axis sends: 5, 0.4, 2; and the Z axis sends 1, 0.6, 9.

Next, at time "T1", the IEEE 1588 chip again bombs the pattern r and the three axes simultaneously send the sequence 2:

the X axis sends: 3, 10, 1;
the Y axis sends: 6, 10, 7; and
the Z axis sends 3, 5, 10.

The sequence continues until sequence 5, the end of the sequence. The entire sequence can then be repeated if the IEEE 1588 chip repeats the entire time-bombing sequence.

Case 2: Motor Systems and Process O/O's Within a Node Component

The motion control between nodes uses I/O points, in addition to the motor control, to allow for such interruptions as emergencies or essential control information. An emergency, for example, can be when an actuator reaches the limit of it's motion. TABLES 4a and 4b provide an example of an extension of TABLE 1 to include I/O's generated by the node components 601 and sent to the controller of the particular node component 601 that generates the output.

TABLE 4a

| | | Inputs | | | |
|---|---|---|---|---|---|
| Node 1 Seq. | Relative Time | Analog Input 1 (v) | Analog Input 2 (v) | Digital Input 1 (logic) | Digital Input 2 (logic) |
| 1 | 0 | 0.34 | 2.5 | 1 | 1 |
| 2 | T1 | 0.1 | X | 1 | 0 |
| 3 | T2 | X | 2.56–2.76 | 1 | X |
| 4 | N | 3.45–3.6 | 1.00 | Z | 1 |
| 5 . . . | T4 | 0.89 | Z | 0 | 1 |
| . . . | | | | | |
| Emergency | X | X | X | X | X |

TABLE 4b

| | Outputs | | | | | | | |
|---|---|---|---|---|---|---|---|---|
| Node 1 Seq. | X-axis | Y-axis | Z-axis | K axis (velocity) | Analog Out. 1 | Analog Out. 2 | Digital Out. 1 | Digital Out 2 |
| 1 | 1 | 5 | 0 | Z | Z | 12 | 1 | Z |
| 2 | 3 | 6 | 0 | X | 5.6 | 0 | 0 | 0 |
| 3 | 5 | 3 | 2 | X | 6.9 | X | X | X |
| 4 | 6 | 10 | 3 | 2 | 2 | U | U | Z |
| 5 . . . | 2 | 0 | 1 | U | X | 23 | 0 | X |
| . . . | | | | | | | | |
| Emergency | S | S | S | S | S | S | S | S |

In the tables the symbols are defined as follows: Z (float output or input), X ("don't care" and it can be a high or low signal), U (unchanged from previous output), S (suspend operation) and N (no time-bomb). TABLES 4a, 4b are processed and translated by a Pattern r of each node axis into separate pre-processed pattern tables for the X-axis, Y-axis and Z-axis similar to TABLE 1 above. This structure intertwines motion and I/O to form coherent performance. Motion is dependent both on I/O's (digital and/or analog) and time-bombing conditions. It is possible to have a range as the input for the analog inputs, thereby allowing for built in tolerances.

The I/O's can come from within the node or from other nodes. The sequence OUTPUTS are executed only when the INPUT conditions are met. Otherwise the system waits until the INPUT condition is met. If the INPUT conditions are not met, then there is a timeout which is an emergency situation and all the other nodes will be informed.

By default, an emergency sequence is applied to each node that indicates an "EMERGENCY" condition whereby further inputs are not considered and all outputs are suspended. In TABLE 4b the "emergency" suspension of outputs is represented by "S".

In the above tables, the time-bombs occur in relative time, except for the first time bomb which occurs at an absolute time. The reference for the relative times is dynamic and is triggered to start from the completion of the previous sequence. When the value of the time-bomb is "N" (i.e. no time-bomb), as it is at the $4^{th}$ sequence in TABLE 4a, the input conditions are solely dependent on analogue and digital events.

Case 3: Motor Systems and Process I/O's Between Node Components

I/O's generated by any of the node components 601 can also be broadcast to other node components 601 through the network connections. In this case, each of the nodes will have similar tables and Inputs to those of TABLES 4a, 4b, except that the INPUTS of each table can come from other node components 601. Also, the OUTPUTS of tables can be INPUTS to another table of another node component 601. Thus, the system can be expanded to be a very complex web allowing a huge variety of possible actions.

The use of the network for distributing IO information is augmented by the fact that IEEE 1588 has very high and stable resolution which is many orders lower than the actual timing requirements of the physical system as dictated by the TB duration. Hence, the IO information distribution through the net could be at a much faster rate by the use of sub—TB (i.e., sub—TimeBombs or a fraction of a TB). This means that information transfer time from node to node is much faster than the physical activity time, which is exactly what real-time systems require.

The system of the present invention is therefore a complex web of interconnected time-bombs, analogue inputs and digital inputs crisscrossing multiple node components 601.

There are many advantages to this invention:

1. All motion axes can be synchronized by time, analogue events and digital events in a large variety of combinations.

2. Gear and cam trains no longer need to be used for timing purposes.

3. Less wiring is required.

4. There is no need for any kind of bus other than the Ethernet.

5. The time-bombs provide precise timing for the distributed control.

6. The sub-timebombs provide early IO control information via the network.

In the foregoing specification, the invention has been described with reference to specific exemplary embodiments thereof. The specification and drawings are, accordingly, to be regarded in an illustrative sense rather than a restrictive sense.

The invention claimed is:

1. A method for distributed multi-axis motion control comprising the steps of:

generating a pattern table of a motor system comprising a first node component and a second node component of a multicast communications network, the first node component comprising a first clock and a first actuator and the second node component comprising a second clock and a second actuator;

translating the pattern table into first and second single-direction-of-motion pattern tables each controlling a separate actuator direction of motion in the motor system;

transmitting the first single-direction-of-motion pattern table over the network to the first node component and the second single-direction-of-motion pattern table over the network to the second node component;

synchronizing the first and second clocks with synchronization signals transmitted through the network at a sync interval;

generating time bombs at an interval which is a whole number multiple of the sync interval;

concurrently executing the first step in the sequence of motions defined in the first and second single-direction-of-motion pattern tables for each of the actuators in response to a time-bomb to begin motion of the actuators to produce multi-axis motion of the motor system; and continuing execution of subsequent steps in the sequence of motions defined in the first and second single-direction-of-motion pattern tables in response to subsequent time-bombs to produce synchronized multi-axis motion of the motor system.

2. The method of claim 1, wherein the multicast communications network further comprises additional node components each having an additional actuator and an additional clock;

and further comprising the steps of:

translating the pattern table into additional single-direction-of-motion pattern tables each controlling a separate one of the additional actuators;

transmitting the additional single-direction-of-motion pattern tables over the network to corresponding ones of the additional node components;

synchronizing the additional clocks with the synchronization signals;

concurrently executing the first step in the sequence of motions defined in the first, second and additional single-direction-of-motion pattern tables for each of the actuators in response to a time-bomb to begin motion of the actuators to produce multi-axis motion of the motor system; and continuing execution of subsequent steps in the sequence of motions defined in the first, second and additional single-direction-of-motion pattern tables in response to subsequent time-bombs to produce synchronized multi-axis motion of the motor system.

3. The method of claim 1, wherein the multicast communications network is Ethernet.

4. The method of claim 1, further comprising the step of synchronizing the clocks using the IEEE 1588 standard.

5. The method of claim 1, further comprising the step of generating an I/O from the second node component causing the second node component to stop considering further inputs and suspending further outputs.

6. The method of claim 1, further comprising the step of generating an I/O from the second node component causing the first node component to stop considering further inputs and suspending further outputs.

7. A distributed multi-axis motion control system comprising:

a multicast communications network having:
a first node component comprising a first clock and a first actuator and
a second node component comprising a second clock and a second actuator;

a motor system comprising the first node component and the second node component;

a pattern profile table of the motor system;

a first single-direction-of-motion pattern profile table translated from the pattern profile table, the first single-direction-of-motion pattern table transmitted over the network to the first node component for controlling the first actuator;

a second single-direction-of-motion pattern profile table translated from the pattern table, the second single-direction-of-motion pattern table transmitted over the network to the second node component for controlling the second actuator;

a grandmaster clock generating synchronization signals transmitted through the network at a sync interval for synchronizing the first and second clocks;

a processor for generating time-bombs at an interval which is a whole number multiple of the sync interval;

a time-bomb, from the generated time-bombs, received by the first and second node components and causing concurrent execution of the first step in the sequence of motions defined in the first and second single-direction-of-motion pattern tables for each of the actuators to begin motion of the actuators to produce multi-axis motion of the motor system; and subsequent time-bombs, from the generated time-bombs, received by the first and second node components and causing continuing execution of subsequent steps in the sequence of motions defined in the first and second single-direction-of-motion pattern tables to produce synchronized multi-axis motion of the motor system.

8. The system of claim 7, further comprising:

additional node components each having an additional actuator and an additional clock, each additional clock also synchronized by the synchronization signals generated by the grandmaster clock, and wherein the pattern profile table also includes the additional node components;

additional single-direction-of-motion pattern profile tables translated from the pattern profile table, the additional single-direction-of-motion pattern profile tables transmitted over the network to the additional node components and each controlling a separate one of the additional actuators;

and wherein:

the time-bomb, from the generated time-bombs, is also received by the additional node components, causing concurrent execution of the first step in the sequence of motions defined in the first, second and additional single-direction-of-motion pattern tables for each of the actuators to begin motion of the actuators to produce multi-axis motion of the motor system; and the subsequent time-bombs, from the generated time-bombs, are also received by the additional node components and causing continuing execution of subsequent steps in the sequence of motions defined in the first, second and additional single-direction-of-motion pattern tables to produce synchronized multi-axis motion of the motor system.

9. The system of claim 7, wherein the multicast communications network is Ethernet.

10. The system of claim 7, wherein the clocks are synchronized using the IEEE 1588 standard.

11. The system of claim 7, further comprising an I/O generated from the second node component causing the second node component to stop considering further inputs and suspending further outputs.

12. The system of claim 7, further comprising an I/O generated from the second node component causing the first node component to stop considering further inputs and suspending further outputs.

13. The system of claim 7, further comprising sub-time-bombs for I/O control information distribution through the network, thereby giving early IO control information to the node components for consideration in their operation at the time of a next following time-bomb.

* * * * *

UNITED STATES PATENT AND TRADEMARK OFFICE
CERTIFICATE OF CORRECTION

PATENT NO. : 7,174,474 B1 Page 1 of 1
APPLICATION NO. : 11/248855
DATED : February 6, 2007
INVENTOR(S) : Moon Low It is certified that error appears in the above-identified patent and that said Letters Patent is hereby corrected as shown below:

Column 12:
In Claim 13, delete "IO" and
insert -- I/O --, therefor.

Signed and Sealed this

Twenty-ninth Day of July, 2008

JON W. DUDAS
*Director of the United States Patent and Trademark Office*

UNITED STATES PATENT AND TRADEMARK OFFICE
CERTIFICATE OF CORRECTION

PATENT NO. : 7,174,474 B1　　　　　　　　　　　　　　　　　　　　　　Page 1 of 1
APPLICATION NO. : 11/248855
DATED : February 6, 2007
INVENTOR(S) : Moon Low It is certified that error appears in the above-identified patent and that said Letters Patent is hereby corrected as shown below:

Column 12:
In Claim 13, line 11 delete "IO" and
insert -- I/O --, therefor.

This certificate supersedes the Certificate of Correction issued July 29, 2008.

Signed and Sealed this

Twenty-sixth Day of August, 2008

JON W. DUDAS
*Director of the United States Patent and Trademark Office*